United States Patent [19]

Retallick

[11] 4,301,039
[45] Nov. 17, 1981

[54] METHOD OF MAKING A METAL CATALYST SUPPORT

[76] Inventor: William B. Retallick, 1432 Johnny's Way, West Chester, Pa. 19380

[21] Appl. No.: 130,968

[22] Filed: Mar. 17, 1980

[51] Int. Cl.$^3$ ............................................. B01J 35/02
[52] U.S. Cl. ................................. 252/477 R; 428/582; 428/592; 428/597; 428/603; 428/604
[58] Field of Search .................... 252/477 R; 428/582, 428/592, 597, 603, 604

[56] References Cited

U.S. PATENT DOCUMENTS

| | | | |
|---|---|---|---|
| 3,135,381 | 6/1964 | Holcombe | 428/592 |
| 3,376,120 | 4/1968 | Hiegel | 428/592 |
| 3,770,389 | 10/1973 | Kitzner et al. | 252/477 R |
| 3,891,575 | 6/1976 | Brautigam et al. | 252/455 R |

Primary Examiner—W. J. Shine
Attorney, Agent, or Firm—Paul and Paul

[57] ABSTRACT

The catalyst support is a spiral formed by winding a single strip of metal upon itself. Indentations in the strip maintain a uniform spacing between the layers in the spiral. The indentations are displayed along the strip in at least two different patterns. Different patterns are wound onto successive layers in the spiral so that the indentations in successive layers cannot coincide and nest together.

12 Claims, 2 Drawing Figures

METHOD OF MAKING A METAL CATALYST SUPPORT

BACKGROUND OF THE INVENTION

U.S. Pat. No. 4,162,993 describes a catalyst support formed by winding a single strip of metal upon itself, wherein the spacing between layers of the spiral is uniform and equal to the height of the indentations in the strip. The indentations are spaced along the strip in a pattern that varies, and is not repeated in any layer of the spiral. By varying the pattern in this way, the indentations in successive layers are prevented from nesting together. If the indentations are formed by passing the strip between a pair of die wheels, and if the circumference of the die wheels is at least as great as the diameter of the finished spiral, and if the pattern of spacing is not repeated around the circumference of the die wheels, then the indentations in successive layers cannot nest together. This is the essence of U.S. Pat. No. 4,162,993. It is an economical way to construct spirals of small diameter, say for automobile mufflers and for small catalytic combustors. But for spirals having a diameter of more than about 20 cm., the cost of the die wheel is excessive. An object of the present invention is to enable us to wind spirals of any diameter, using die wheels having a diameter that is both smaller than, and independent of, the diameter of the spiral.

BRIEF DESCRIPTION OF THE DRAWINGS

FIG. 1 shows a spiral being wound onto a mandrel. There is a pointer 10 that rotates with the mandrel. Whenever the pointer passes through some fixed point, say 12 o'clock, it trips a mechanism that changes the pattern being wound onto the spiral. Whether the mechanism be mechanical or electric is immaterial. What is important is that the pattern being wound onto the spiral is changed automatically at the beginning of each new layer. Also shown in FIG. 1 are a first and second set of die wheels, 11 and 12. How they cooperate is explained later on.

DETAILED DESCRIPTION OF THE PREFERRED EMBODIMENTS

Figure 1:
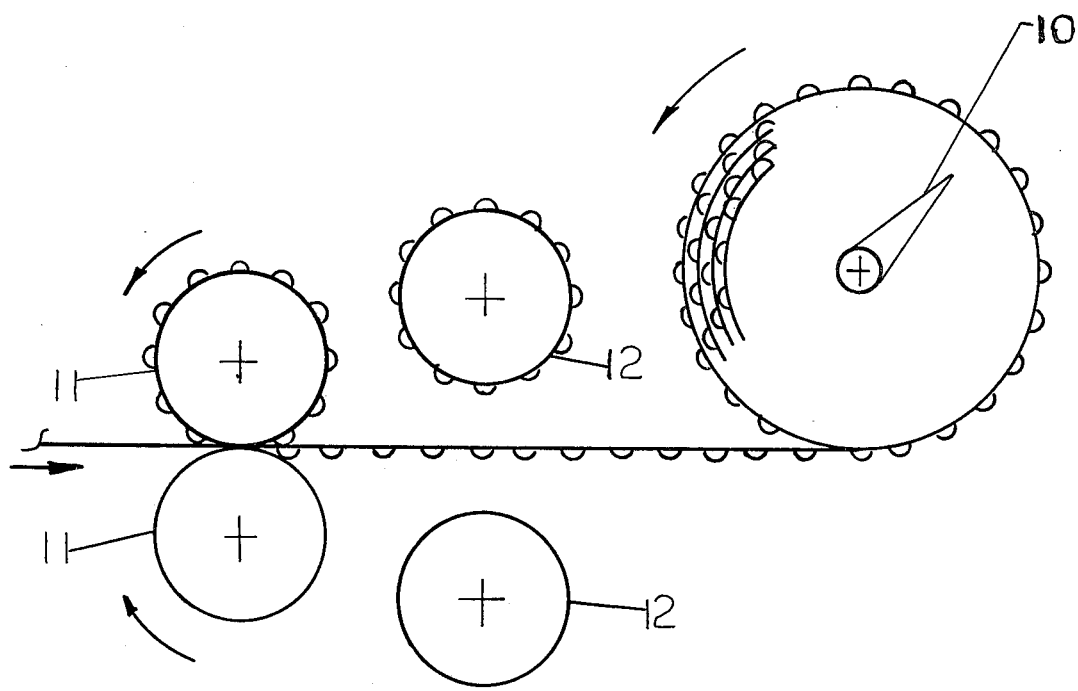

All that is necessary to prevent successive layers from nesting together is that the pattern formed by the indentations be different in successive layers. This can be accomplished with just two different patterns that repeat in alternate layers. More than two patterns can be used, but two are sufficient. FIG. 1 indicates some methods for winding a spiral having just two patterns that repeat in alternate layers.

These methods are:

1. The first pair of die wheels 11 is in mesh continuously.

The second pair 12 is in mesh only while alternate layers are being wound onto the spiral. Pair 12 prints one or more rows of indentations between the rows already printed by pair 11.

2. There is only one set of die wheels, be it the first or second set in FIG. 1. The pattern being printed is not centered on the center line of the strip, so that there is a wider border along one side of the strip, and a narrower border along the other side. Upon signal from the pointer 10, the strip stops, the die wheels are parted and moved across the strip, so that the positions of the wide and narrow borders are reversed. Then printing is resumed.

3. This is the same as Method 2, except that the strip is not stopped upon signal, but instead the strip is urged to the opposite side of the die wheels, to reverse gradually the positions of the borders.

4. There is only one pair of die wheels. Instead of printing the indentations in FIG. 2, the wheels corrugate the strip. The resulting spiral resembles those in U.S. Pat. Nos. 3,770,389 and 3,891,575, except that it is wound from a single strip instead of from one flat and one corrugated strip.

5. Now let us wind a spiral having more than two patterns. One method would be to have a pair of die wheels for each pattern. Upon signal from the pointer, the strip stops, and the single pair of die wheels is changed.

Figure 2:
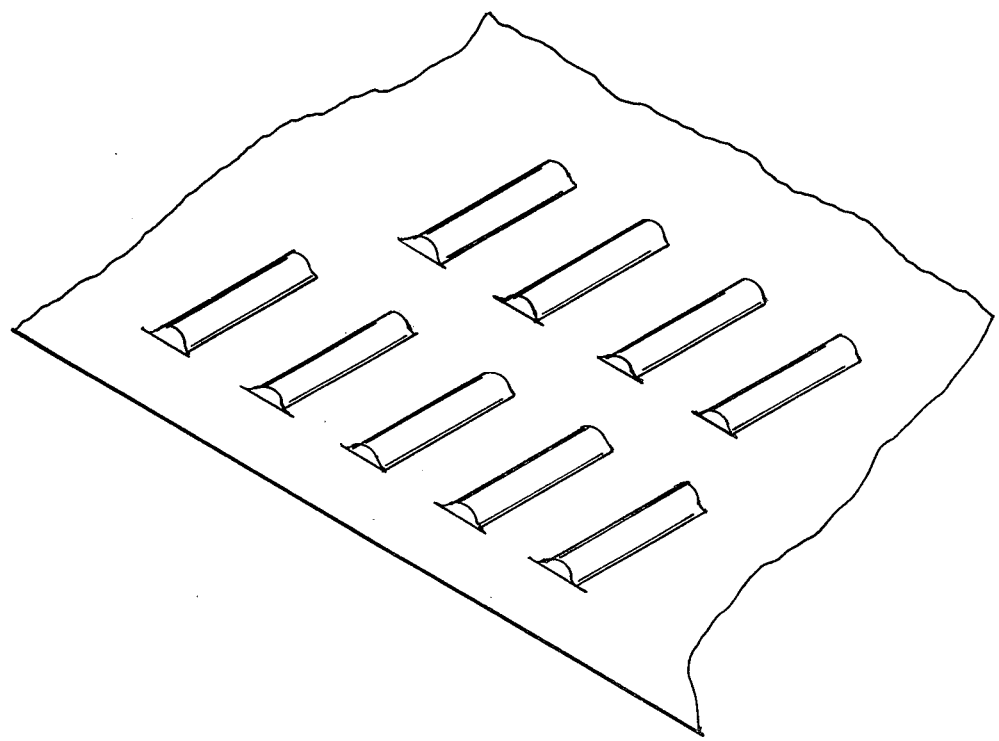
FIG. 2 is a perspective view of a fragmentary portion of a single strip showing first and second rows of indentations of uniform height.

FIG. 2 shows the preferred shape for the indentations. This shape is cylindrical, which means that the surface is generated by a straight line that remains parallel to its original position as it generates the surface. The ends of the indentations are open. The indentations are aligned perpendicular to the length of the strip, and therefore parallel to the axis of the spiral. The indentations present only the edge of the indented metal to the gas flowing through the spiral.

As is seen in FIG. 1 (and also as is claimed in U.S. Pat. No. 4,162,993, cited above), the indentations are of uniform height, so that the spacing between layers of the spiral is equal to this height. When Method Nos. 1, 2, 3, or 5, described above, are used, different patterns are wound onto successive layers of the catalyst support, so that the indentations in successive layers cannot coincide and nest together.

The metal catalyst support is coated with a catalyst by processes known in the art.

What is claimed is:

1. A method of making a metal catalyst support, comprising the steps of:
    impressing a first pattern of indentations on a moving strip of metal while winding the strip on a rotating receiving means, the indentations being of uniform height so that the spacing between layers is equal to this height, and,
    intermittently impressing a second pattern of indentations on a portion of the strip which has not yet been wound on the receiving means, the indentation of the second pattern being of uniform height, whereby different patterns are wound onto successive layers of the catalyst support so that the indentations in successive layers cannot coincide and nest together.

2. The method of claim 1, wherein the intermittent impressing of the strip is started and stopped in response to signals generated by the receiving means.

3. The method of claim 2, wherein the intermittent impressing step is performed during alternate full rotations of the receiving means.

4. A method of making a metal catalyst support, comprising the steps of:
    impressing a first pattern of indentations on a moving strip of metal while winding the strip on a rotating receiving means, the indentations being positioned such that there is a wider border along one side of the strip and a narrower border on the other side of the strip, and impressing a second pattern of indentations on the other side of the strip, such that the wide border of the first pattern corresponds to the narrow border of the second pattern, and the narrow border of the first pattern corresponds to the wide border of the second pattern, the indentations of both the first and second patterns being of uniform height so that the spacing between layers is equal to this height, and whereby different patterns are wound onto successive layers of the catalyst support so that the indentations in successive layers cannot coincide and nest together.

5. The method of claim 4, wherein the first and second impressing steps are performed in repeated alternate sequence.

6. The method of claim 5, wherein the first and second impressing steps are performed in response to signals generated by the receiving means.

7. The method of claim 6, wherein each of the impressing steps is performed during one full rotation of the receiving means.

8. The method of claim 4, further comprising stopping the strip after the first impressing step and before the second impressing step.

9. The method of claim 4, wherein the impressing steps are accomplished by passing the strip through a pair of die wheels, and wherein the transition from the first to the second impressing step is performed by gradually shifting the strip from a position near one side of the die wheels to a position near the other side of the die wheels.

10. A method of making a metal catalyst support comprising the steps of:

impressing a first pattern of indentations on a moving strip of metal while winding the strip on a rotating receiving means, the impressing being performed by passing the strip through a pair of intermeshing die wheels, the indentations being of uniform height so that the spacing between layers is equal to this height, stopping the strip, replacing the die wheels with a second set of die wheels, the second set of die wheels defining a second pattern, different from the first pattern, of indentations of uniform height, and re-starting the movement of the strip, whereby different patterns are wound onto successive layers of the catalyst support so that the indentations in successive layers cannot coincide and nest together.

11. The method of claim 10, further comprising the steps of alternately stopping and re-starting the strip, and changing the die wheels during the time the strip is stopped.

12. The method of claim 11, wherein the stopping of the strip is caused by a signal from the receiving means.

* * * * *